(12) United States Patent
Zhang et al.

(10) Patent No.: US 10,917,577 B2
(45) Date of Patent: Feb. 9, 2021

(54) METHOD AND DEVICE FOR CONTROLLING CAMERA SHOOTING, SMART DEVICE, AND STORAGE MEDIUM

(71) Applicant: SHENZHEN GRANDSUN ELECTRONIC CO., LTD., Guangdong (CN)

(72) Inventors: Zhonghai Zhang, Shenzhen (CN); Haiquan Wu, Shenzhen (CN); Enqin Zhang, Shenzhen (CN); Lei Cao, Shenzhen (CN); Ruiwen Shi, Shenzhen (CN)

(73) Assignee: SHENZHEN GRANDSUN ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 16/373,883

(22) Filed: Apr. 3, 2019

(65) Prior Publication Data
US 2019/0313031 A1 Oct. 10, 2019

(30) Foreign Application Priority Data
Apr. 4, 2018 (CN) .......................... 2018 1 0299510

(51) Int. Cl.
*H04N 5/232* (2006.01)
*G06K 9/00* (2006.01)
(Continued)

(52) U.S. Cl.
CPC ..... *H04N 5/23299* (2018.08); *G06K 9/00228* (2013.01); *G10L 15/02* (2013.01);
(Continued)

(58) Field of Classification Search
CPC .......... H04N 5/23299; H04N 5/23219; H04N 7/147; H04N 7/15; G06K 9/00228;
(Continued)

(56) References Cited

U.S. PATENT DOCUMENTS 9,591,229 B2 * 3/2017 Chen ...................... H04N 7/142
2006/0214787 A1 9/2006 Coonce et al.
(Continued)

FOREIGN PATENT DOCUMENTS

| CN | 102256098 A | 11/2011 |
| CN | 105611167 A | 5/2016 |

(Continued)

*Primary Examiner* — Maria E Vazquez Colon
(74) *Attorney, Agent, or Firm* — Westman, Champlin & Koehler, P. A.

(57) ABSTRACT

The present application relates to the technical field of communication, and provides a method and device for controlling camera shooting, a smart device, and a storage medium, including: recognizing whether or not a voice contains a keyword when the voice is detected; determining a sound source angle of a sound source object sending the voice if the voice contains the keyword; controlling the camera to turn according to the sound source angle of the sound source object sending the voice, such that the sound source object sending the voice is located within an image shooting range of the camera. In this way, preventing the camera from turning frequently when multiple people are speaking at the same time and causing shaking.

13 Claims, 5 Drawing Sheets

(51) Int. Cl.
*G10L 15/02* (2006.01)
*G10L 15/08* (2006.01)
*G10L 15/22* (2006.01)
*H04N 7/14* (2006.01)
*H04N 7/15* (2006.01)

(52) U.S. Cl.
CPC .............. *G10L 15/08* (2013.01); *G10L 15/22* (2013.01); *H04N 5/23219* (2013.01); *H04N 7/147* (2013.01); *G10L 2015/088* (2013.01); *G10L 2015/223* (2013.01); *H04N 7/15* (2013.01)

(58) Field of Classification Search
CPC ......... G10L 15/02; G10L 15/08; G10L 15/22; G10L 2015/088; G10L 2015/223
See application file for complete search history.

(56) References Cited

U.S. PATENT DOCUMENTS

| | | | | |
|---|---|---|---|---|
| 2011/0175999 | A1* | 7/2011 | McCormack | H04N 7/183 348/143 |
| 2011/0285808 | A1* | 11/2011 | Feng | H04N 7/147 348/14.09 |
| 2012/0033030 | A1 | 2/2012 | Liu et al. | |

FOREIGN PATENT DOCUMENTS

| | | | |
|---|---|---|---|
| CN | 106888361 | A * | 6/2017 |
| CN | 106888361 | A | 6/2017 |
| CN | 107809596 | A | 3/2018 |
| EP | 2882180 | A1 | 10/2015 |

\* cited by examiner

METHOD AND DEVICE FOR CONTROLLING CAMERA SHOOTING, SMART DEVICE, AND STORAGE MEDIUM

TECHNICAL FIELD

The present application relates to the technical field of communication, and more particularly to a method and a device for controlling camera shooting, a smart device, and a storage medium.

BACKGROUND

The rise of internet technology has greatly enriched the way people communicate, and communication between people in different regions has become more and more convenient. Among them, the remote video conferencing system, as an important remote communication technology, greatly improves the efficiency of the enterprise because of its convenience and high efficiency.

In the prior art, during the process of a video conference, there is the case of frequent discussion between different participants. When a participant A expresses a viewpoint, the system calculates the position of the participant A according to the detected voice and starts the camera to aim at the participant A, however, it is very likely that when the participant A has finished, the camera has not been turned to align the participant A, and at this time, a participant B begins to express his viewpoint, the system calculates the position of the Participant B by the detected voice of the participant B, and controls the camera to turn towards the direction of the participant B, at this time a participant C has started to speak or there is a case of a plurality of participants speaking at the same time. By adopting the simple following of the camera, shaking of the camera between different participants is caused.

In summary, in the existing video conferencing technology, the camera shooting, the frequent rotation of the camera during the conversation of multiple participants easily results in shaking, and the video shooting has low efficiency.

SUMMARY

For this reason, the present application provides a method and device for controlling a camera, a smart device, and a storage medium to solve the problems that in the existing video conferencing technology, the camera shooting, the frequent rotation of the camera during the conversation of multiple participants easily results in shaking, and the video shooting has low efficiency.

In a first aspect of the present application, a method for controlling camera shooting, the method includes:

recognizing whether or not a voice contains a keyword when the voice is detected;

determining a sound source angle of a sound source object sending the voice if the voice contains the keyword;

controlling the camera to turn according to the sound source angle of the sound source object sending the voice, such that the sound source object sending the voice is located within an image shooting range of the camera.

In a second aspect of the present application, a device for controlling a camera, the device includes:

a keyword recognition unit, configured to recognize whether a keyword is contained in the voice when the voice is detected;

a sound source locating unit, configured to determine a sound source angle of the sound source object sending the voice if the keyword is contained in the voice;

a first shooting control unit, configured to control the camera to turn according to a sound source angle of the sound source object sending the voice, such that the sound source object sending the voice is located within an image shooting range of the camera.

In a third aspect of the present application, a smart device, including a memory, a processor, and a computer program stored in the memory and operable on the processor, when the computer program is executed by the processor, the steps of the method for controlling camera shooting according to the first aspect are implemented.

In a fourth aspect of the present application, a computer readable storage medium, the computer readable storage medium is stored a computer program, when the computer program is executed by a processor, the steps of the method for controlling camera shooting according to the first aspect are implemented.

Compared with the prior art, the embodiment of the present application has the following beneficial effects: when detecting a voice, the embodiment of the present application first identifies whether there is a keyword in the voice, and if there is a keyword in the voice, then determining a sound source angle of the sound source object sending the voice, then controlling the camera to turn according to the sound source angle of the sound source object sending the voice, such that the sound source object sending the voice is located within an image shooting range of the camera, turning the camera to shoot the sound source object is effective, which prevents the camera from turning frequently when multiple people are speaking at the same time, therefore the accuracy of video shooting is improved, and the user experience is enhanced.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION

In the following description, specific details such as specific system architectures, techniques, and the like are presented for better understood the embodiments of the present application and for purposes of illustration and not for limitation. However, it will be apparent to those skilled in the art that the present application may be practiced in other embodiments without these specific details. In other cases, detailed descriptions of well-known systems, devices, circuits, and methods are omitted so as not to obscure the description of the present application.

The embodiment of the present application provides a method and device for controlling camera shooting, a smart device, and a storage medium, in order to accurately determine a subject in the case of multiple people are speaking at the same time, and prevent the camera from frequently turning to cause shaking, which is mainly implementation by identifying whether there is a keyword in a voice, when the voice is detected, and if there is a keyword in the voice, determining a sound source angle of the sound source object sending the voice, and controlling the camera to turn according to the sound source angle of the sound source object, such that the sound source object is located within the image shooting range of the camera. In order to specifically describe the above-described method and device for controlling camera shooting, a smart device, and a storage medium, the following description will be made by way of specific embodiments.

In order to explain the technical solution described in the present application, the following description will be made by way of specific embodiments.

Embodiment 1

Figure 1:
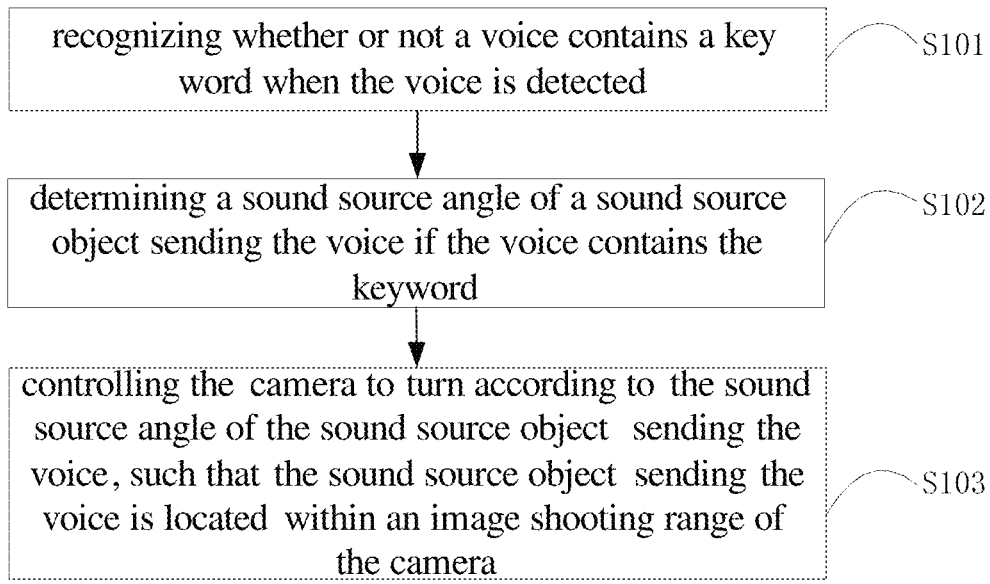
FIG. 1 is an implementation flowchart of a method for controlling camera shooting according to an embodiment of the present application.

FIG. 1 is a flowchart of a method for controlling camera shooting according to an embodiment of the present application, where the method includes steps S101 to S103. The specific implementation principles of each step are detailed as follows:

Step S101, recognizing whether or not a voice contains a keyword when the voice is detected.

In the embodiment of the present application, when a video call or a video conference is required, the smart device is used to track the sound source objects. The smart device starts to collect the voice in the current scene in real time after the smart device is turned on. Specifically, the microphone array is used to collect voice in real time in all directions, and the voices from anyone in the current scene are received. The smart device may be an intelligent robot, or may be a smart speaker with a rotatable camera which collects the voice through the microphone array thereof, and shoot a video through the rotatable camera. When the microphone array collects the voice, the microphone array recognizes whether there is a keyword in the voice, and the keyword refers to a word or a sentence specified by the user in advance for triggering the camera to turn, and the keyword can be reset by the user.

Optionally, in the embodiment of the present application, in order to accurately recognize the keywords in the voice, the step S101 includes:

A1. converting the voice into a text information when a voice is detected.

A2. performing word segmentation based on the text information. Specifically, the text information is broken into words according to a grammatical format. Further, a word split from a voice information is stored as a set of word vectors. The word vector is further provided with an identifier bit for identifying the voice corresponding to the word vector.

A3. matching the word split from the voice information with preset keywords to determine whether a keyword exist in the voice; Specifically, if the word split from the voice information is matched with the preset keywords, then the keyword is determined to be existed in the voice; if the word split from the voice information does not match the preset keywords, then the keyword is not existed in the voice.

In the embodiment of the present application, the voice is converted into text information and the word segmentation process is performed, and by matching the word split from the voice information with the preset keywords to determine whether there is a keyword in the voice, the accuracy of the keyword recognition can be improved.

Optionally, the meaning of the voice may be recognized by performing semantic recognition on the detected voice. If the meaning of the identified voice is the same as the preset keywords, determining that the keyword is contained in the voice and the rotation of the camera can be triggered. If the meaning of the voice is different from the meaning of the preset keywords, then determining that there is no keyword in the voice, that is, the rotation of the camera cannot be triggered.

Step S102: determining a sound source angle of a sound source object sending the voice if the voice contains the keyword.

In the embodiment of the present application, when a specified keyword is contained in the voice, the sound source direction of the voice may be acquired by a microphone array algorithm. A single microphone can only acquire sound information, and a microphone array composed of a plurality of microphones arranged according to a certain geometric position can acquire not only sound information but also spatial information of the sound, for example, determining a sound source angle of the voice. The microphone array algorithm refers to a microphone array composed of a set of microphones placed at a certain geometric position, and the sound source direction of the sound source is located by calculating a relative delay time between a sound source and each microphone, and a sound wave arrival time difference. In the embodiment of the present application, the number and arrangement of the microphone array are not limited, and may be horizontal sorting, vertical sorting, or random sorting, but when the number and arrangement of the microphone arrays are determined, the position of each microphone unit in the microphone array is determined.

Step S103, controlling the camera to turn according to the sound source angle of the sound source object sending the voice, such that the sound source object sending the voice is located within an image shooting range of the camera.

In the embodiment of the present application, when the keyword is identified in the detected voice, then the rotation of the camera is triggered, and the direction in which the camera needs to be turned is determined according to the sound source angle of the voice, in order to improve the shooting effect, when the camera is turned toward the sound source of the voice, the sound source object corresponding to the sound source is made to be in the center of the image shooting range of the camera. Further, when the smart device (or the camera) is closer to the sound source object corresponding to the sound source, adjusting the optical parameter of the camera such that the face of the sound source object corresponding to the sound source is within the center of the image shooting range of the camera.

Optionally, the step S103 includes:

B1. acquiring a current angle of the camera.

B2. calculating an angular difference between the sound source angle and a current angle of the camera, and the sound source angle and the current angle of the camera are both relative angles.

B3. controlling the camera to turn according to a preset rotation speed according to the angular difference between the sound source angle and the current angle of the camera, such that the sound source object sending the voice is located within an image shooting range of the camera. Specifically, the preset rotation speed refers to the speed of the motor. In the embodiment of the present application, by presetting the rotation speed, the rotation speed of the camera is prevented from being too fast and causing the shooting image to be unstable, or the rotation speed is too slow and the time is lost, which affects the efficiency.

Optionally, the B3 specifically includes:

B31. controlling the camera to turn toward the sound source at a first rotation speed according to an angular difference between the sound source angle and the current angle of the camera.

B32. performing face detection. If a face is detected, controlling the camera to turn at a second rotation speed, such that the sound source object sending the voice is located at a center of the image shooting range of the camera, wherein, the first rotation speed is greater than the second rotational speed, and the first rotational speed and the second rotational speed are both motor speeds.

In the embodiment of the present application, since the sound source angle is a direction angle, not an accurate angle of the sound source object corresponding to the sound source, therefore, in order to save time, the camera is quickly turned to the sound source according to the angular difference between the sound source angle and the current angle of the camera, and then the motor speed is slowed down, and then the motor speed is slowed down, and the face detection technology is activated to acquire the face of the sound source object in the image shooting range of the camera, the orientation of the camera is accurately adjusted such that the face is in the center of the picture.

In the embodiment 1 of the present application, when a voice is detected, whether a keyword is contained in the voice is first identified, and if a keyword is contained in the voice, determining a sound source angle of the sound source object sending the voice, then controlling the camera to turn according to the sound source angle of the sound source object sending the voice, such that the sound source object sending the voice is located within the image shooting range of the camera, in order to save time, the camera is quickly turned toward the direction of the sound source of the voice, then the rotation speed is reduced and the angle of the camera is accurately adjusted such that the sound source object corresponding to the sound source is within the center of the image shooting range of the camera, thereby the camera is effectively turned to shoot the sound source object, and prevent the camera from frequently turning and causing shaking when multiple people are speaking at the same time, and the accuracy of video shooting is improved, the user experience is enhanced.

Embodiment 2

Figure 2:
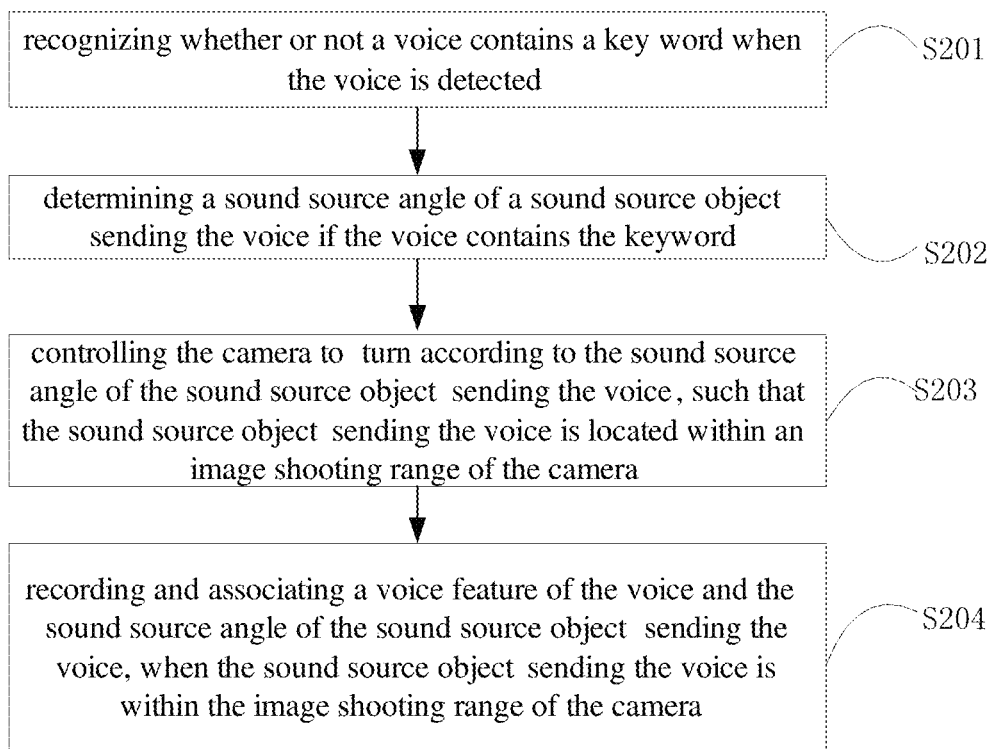
FIG. 2 is an implementation flowchart of a method for controlling camera shooting including recording a sound source angle corresponding to a sound source object according to an embodiment of the present application.

Based on the method for controlling camera shooting provided in the first embodiment, another embodiment of the present application is provided. FIG. 2 is a flowchart of a method for controlling camera shooting according to the embodiment 2, which is described in detail as follows:

Step S201, recognizing whether or not a voice contains a keyword when the voice is detected.

Step S202, determining a sound source angle of a sound source object sending the voice if the voice contains the keyword.

Step S203, controlling the camera to turn according to the sound source angle of the sound source object sending the voice, such that the sound source object sending the voice is located within an image shooting range of the camera.

For the specific steps of the step S201 to the step S203, refer to the steps S101 to S103 of the embodiment 1, and details are not described herein again.

Step S204, recording and associating a voice feature of the voice and the sound source angle of the sound source object sending the voice, when the sound source object sending the voice is within the image shooting range of the camera.

Specifically, when the sound source object corresponding to the sound source is in the center of the image shooting range of the camera, the sound source angle corresponding to the sound source object is recorded, and the sound source angle corresponding to the sound source object is the angle of the camera (ie, the exact angle of the motor relative to the reference point) when the sound source object is located within the center of the image shooting range of the camera, and the voice features of the voice, such as the sound source angle, the sound characteristics and the like are also recorded, wherein, the sound feature refers to the available indicates the characteristics of the sound source object, including tone, sound frequency and sound intensity and the like. The recorded sound source angle corresponding to the sound source object is correlated with the voice feature of the voice, and further, the recorded sound source angle corresponding to the sound source object and the voice feature of the voice are stored as a two-dimensional array, that is, a two-dimensional array stores a sound source angle corresponding to the sound source object and a voice feature of the sound source object.

Certainly, the two-dimensional array may be a range of degrees including a sound source angle corresponding to the sound source object, for example, a degree interval after the sound source angle corresponding to the sound source object is up and down by a certain degree. When a detected sound source angle of the new voice is within the recorded degree interval, the camera can be quickly turned to align the sound source object.

Figure 3:
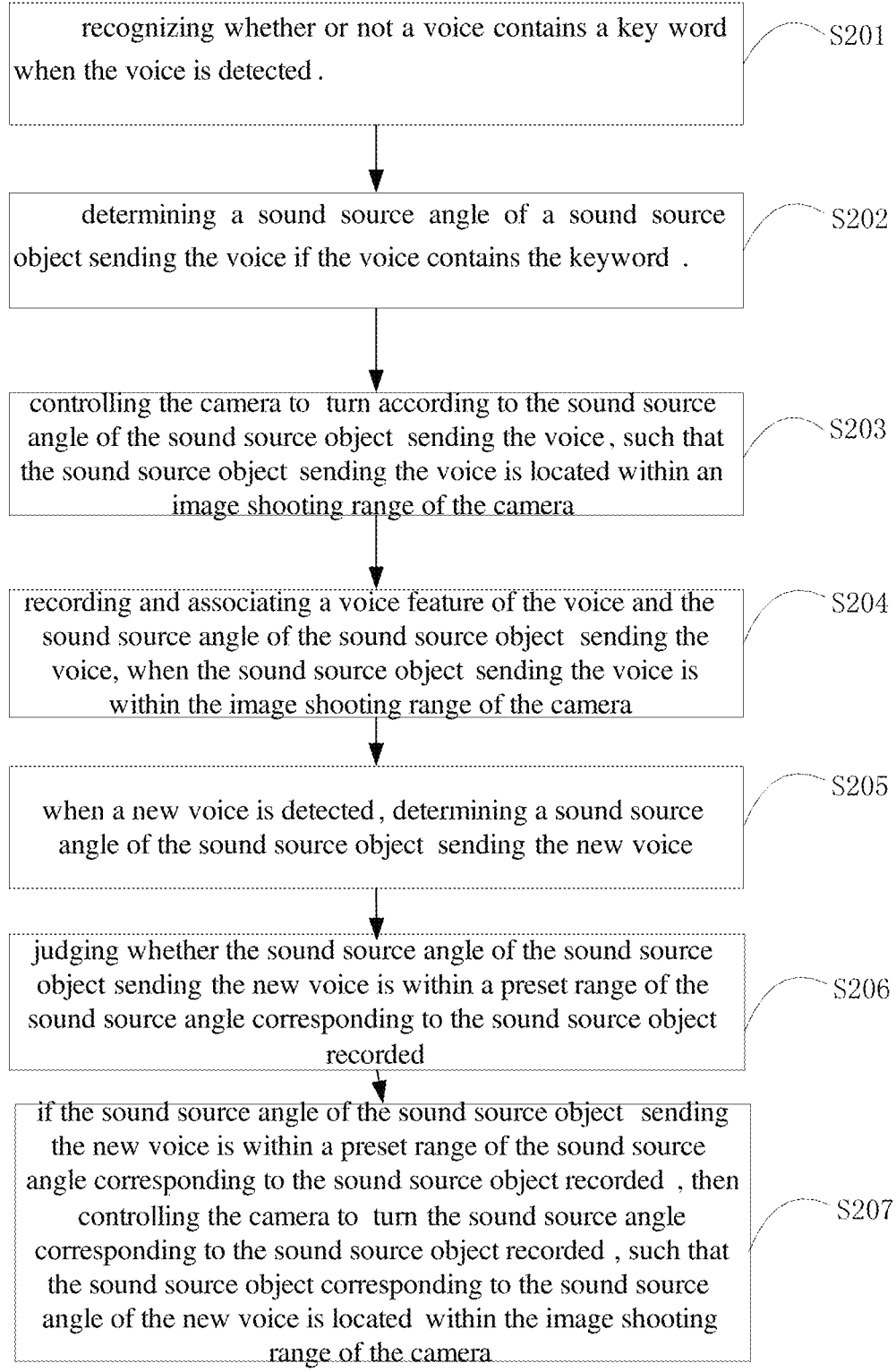
FIG. 3 is an implementation flowchart of a method for controlling camera shooting including a re-shooting of a sound source object according to an embodiment of the present application.

Optionally, as shown in FIG. 3, after the step S204, the method further includes:

Step S205, when a new voice is detected, determining a sound source angle of the sound source object sending the new voice.

Step S206, judging whether the sound source angle of the sound source object sending the new voice is within a preset range of the sound source angle corresponding to the sound source object recorded.

Step S207, if the sound source angle of the sound source object sending the new voice is within a preset range of the sound source angle corresponding to the sound source object recorded, then controlling the camera to turn the sound source angle corresponding to the sound source object recorded, such that the sound source object corresponding to the sound source angle of the new voice is located within the image shooting range of the camera.

Figure 3A:
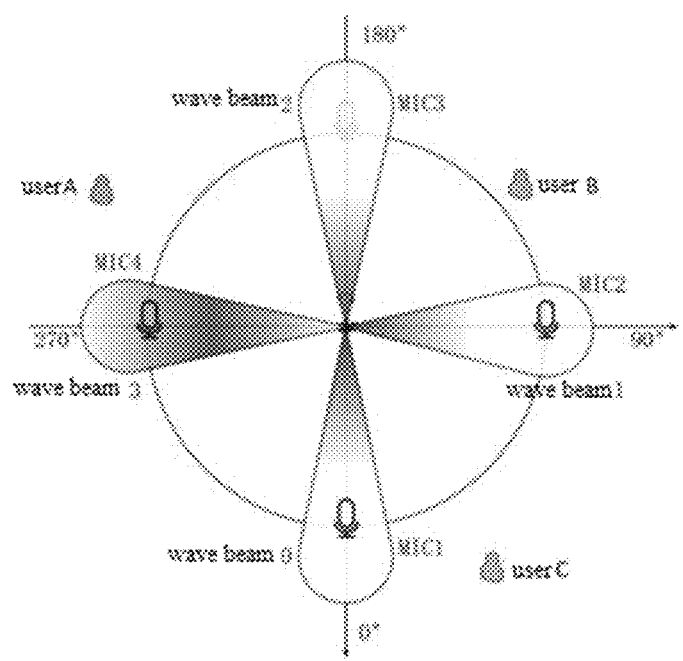
FIG. 3A is a schematic diagram of an application scenario of a method for controlling camera shooting according to an embodiment of the present application.

Taking an application scenario as an example, in a video conference, using a smart speaker with four microphone arrays and a camera, the positions of the three sound source objects A, B, and C are as shown in FIG. 3A, and the keyword "smart boy" is preset. When A is speaking, the microphone array is used to record the words of the A into the system, the system uses the keyword recognition algorithm to detect whether A has spoken the keyword. If the keyword "Smart boy" is detected in the voice from A, then acquiring a sound source angle in the voice of A by the microphone array algorithm, thereby determining the A is near the vicinity position of MIC4 according to the acquired sound source angle, then starting the motor and quickly turning the camera to the vicinity of Mic4, then reducing the speed of the motor to perform a face detection, once the face is detected, slowly adjusting the angle of the camera such that the detected face is located within the center of the image shooting range of the camera, then stopping the motor, fixing the position of the camera and recording the precise position of the A, and determining the sound source angle, in the case of following video conference, when the voice of the A is detected again, the camera can be quickly turned to the A to reduce the adjustment time, which can improve the user experience.

In the embodiment 2 of the present application, when a voice is detected, whether a keyword is contained in the voice is first identified, and if a keyword is contained in the voice, determining a sound source angle of the sound source object sending the voice, then controlling the camera to turn according to the sound source angle of the sound source object sending the voice, such that the sound source object sending the voice is located within the image shooting range of the camera, thereby the camera is effectively turned to shoot the sound source object, and prevent the camera from frequently turning and causing shaking when multiple people are speaking at the same time, and the accuracy of video shooting is improved. When the sound source object sending the voice is in the center of the image shooting range of the camera, the voice feature of the voice and the sound source object corresponding to the sound source object of the voice are recorded and associated, such that when the same sound source object speaking can quickly and accurately turn the camera to align the sound source object, which further speed up the shooting efficiency and enhance the user experience.

Embodiment 3

Figure 4:
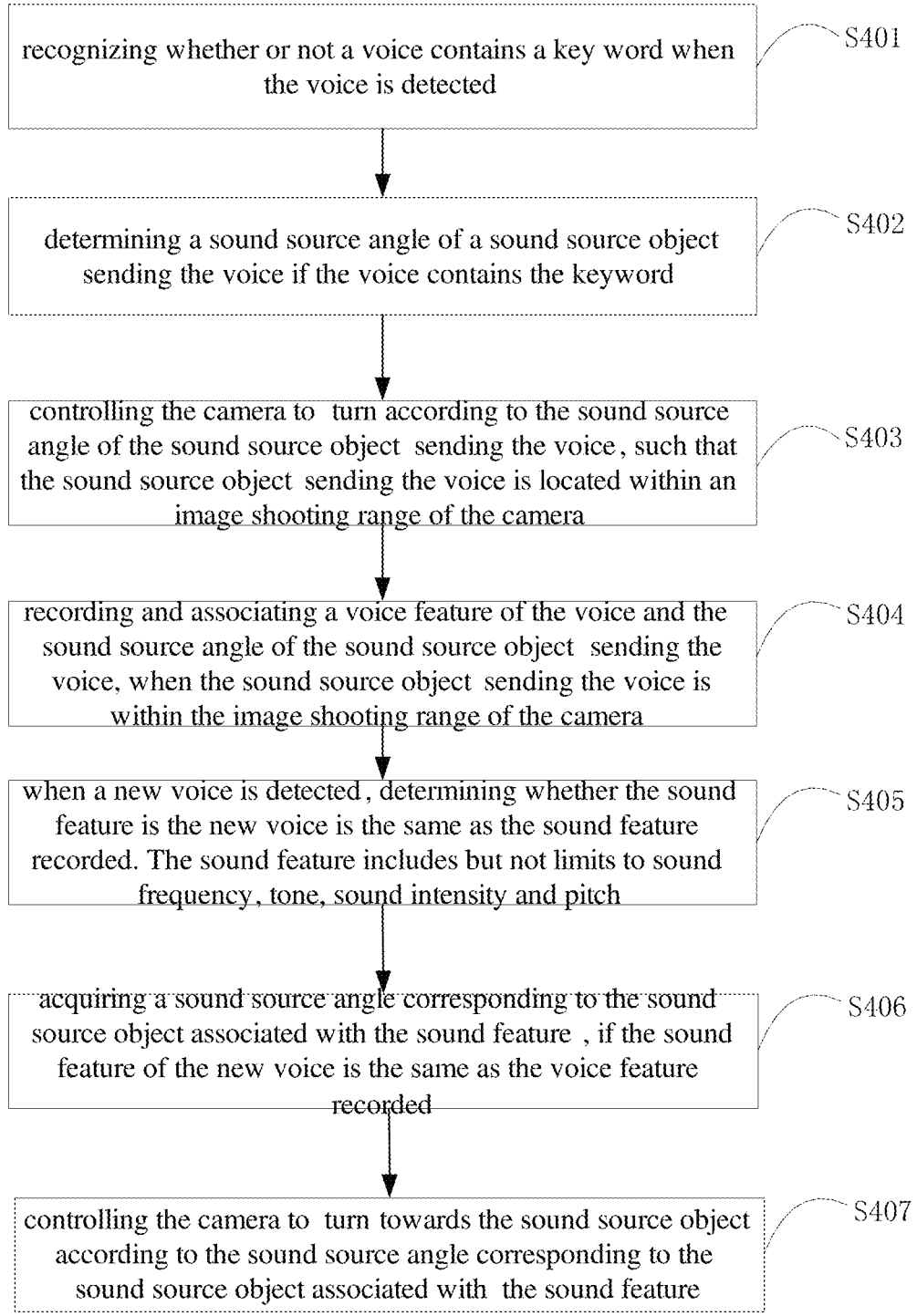
FIG. 4 is an implementation flowchart of a method for controlling camera shooting according to another embodiment of the present application.

Based on the method for controlling camera shooting provided in the embodiment 2, FIG. 4 is a flowchart of a method for controlling camera shooting provided in the embodiment 3, which is described in detail as follows:

Step S401, recognizing whether or not a voice contains a keyword when the voice is detected.

Step S402, determining a sound source angle of a sound source object sending the voice if the voice contains the keyword.

Step S403, controlling the camera to turn according to the sound source angle of the sound source object sending the voice, such that the sound source object sending the voice is located within an image shooting range of the camera.

Step S404, recording and associating a voice feature of the voice and the sound source angle of the sound source object sending the voice, when the sound source object sending the voice is within the image shooting range of the camera.

For the specific steps of step S401 to step S404, refer to step S201 to step S204 of the embodiment 2, and details are not described herein again.

Step S405, when a new voice is detected, determining whether the sound feature is the new voice is the same as the sound feature recorded. The sound feature includes but not limits to sound frequency, tone, sound intensity and pitch.

Step S406. acquiring a sound source angle corresponding to the sound source object associated with the sound feature, if the sound feature of the new voice is the same as the voice feature recorded.

Specifically, when the sound feature of the new voice is the same as the voice feature recorded, the sound source angle corresponding to the sound source object associated with the sound feature is searched from the record, that is, the angle of the camera which recorded when the sound source object first spoken.

Step S407, controlling the camera to turn towards the sound source object according to the sound source angle corresponding to the sound source object associated with the sound feature.

Specifically, according to the sound source angle corresponding to the sound source object associated with the sound feature, the camera is quickly turned at a preset rotation speed to align the sound source object.

In the embodiment 3 of the present application, when a voice is detected, whether a keyword is contained in the voice is first identified, and if a keyword is contained in the voice, determining a sound source angle of the sound source object sending the voice, then controlling the camera to turn according to the sound source angle of the sound source object sending the voice, such that the sound source object sending the voice is located within the image shooting range of the camera, thereby the camera is effectively turned to shoot the sound source object, and prevent the camera from frequently turning and causing shaking when multiple people are speaking at the same time, and the accuracy of video shooting is improved, the user experience is enhanced.

It should be understood that the size of the sequence of the steps in the above embodiments does not imply a sequence of executions, and the order of execution of the processes should be determined by its function and internal logic, and should not be construed as limiting the implementation of the embodiments of the present application.

Embodiment 5

Figure 5:
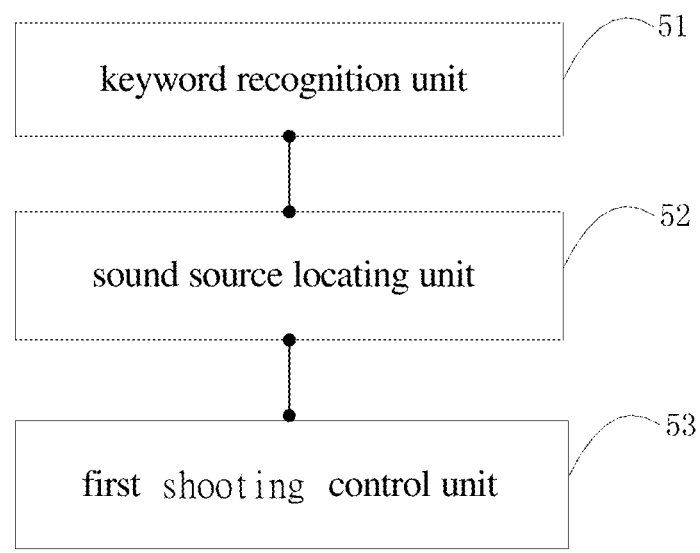
FIG. 5 is a structural block diagram of a device for controlling camera shooting according to an embodiment of the present application.

Corresponding to the method for controlling camera shooting described in the above embodiments, FIG. 5 is a structural block diagram of a device for controlling camera shooting provided by an embodiment of the present application, which may be applied to a smart device, and the smart device may include user device that communicates with one or more core networks via a RAN (Radio Access Network), the user device may be a mobile telephone (or "cellular" telephone) or a computer with a mobile device, etc., for example, the user device may also be portable, pocket-sized Handheld, computer built-in devices that exchange voice and/or data with the RAN. For another example, the user device can be a smart speaker, an intelligent robot, or the like. For the convenience of description, only parts related to the embodiment of the present application are shown.

For the convenience of description, only parts related to the embodiment of the present application are shown.

Referring to FIG. 5, the device for controlling camera shooting includes: a keyword recognition unit 51, a sound source locating unit 52, and a first shooting control unit 53, wherein:

the keyword recognition unit 51, configured to recognize, when the voice is detected, whether a keyword is contained in the voice;

the sound source locating unit 52, configured to determine a sound source angle of the sound source object sending the voice if the keyword is contained in the voice;

the first shooting control unit 53, configured to control the camera to turn according to a sound source angle of the sound source object sending the voice, such that the sound source object sending the voice is located within an image shooting range of the camera.

Optionally, the first shooting control unit 53 specifically includes:

an angle acquiring module, configured to acquire a current angle of the camera;

an angle calculation module, configured to calculate an angular difference between the sound source angle and a current angle of the camera;

a rotation control module, configured to control the camera to turn at a preset rotation speed according to the angular difference between the sound source angle and the current angle of the camera, such that a sound source object sending the voice is located within an image shooting range of the camera.

Optionally, the rotation control module specifically includes:

a first rotation sub-module, configured to control the camera to turn toward the sound source at a first rotation speed according to an angular difference between the sound source angle and a current angle of the camera;

a second rotation sub-module, configured for performing face detection, and if a face is detected, controlling the camera to turn at a second rotation speed, such that the sound source object sending the voice is located within the center of the image shooting range of the camera, and the first rotation speed is greater than the second rotation speed.

Optionally, the device for controlling camera shooting further includes:

an association recording unit 54, configured to record and associate the voice feature of the voice and the sound source angle corresponding to the sound source object sending the voice when the sound source object sending the voice is within the center of the image shooting range of the camera.

Optionally, the device for controlling camera shooting further includes:

a first judgment unit 55, configured to judge, when a new voice is detected, whether the sound feature of the new voice is the same as the voice feature recorded;

The first judgment unit 55 is further configured to: if the sound feature of the new voice is the same as the sound feature recorded, then acquiring a sound source angle corresponding to the sound source object associated with the sound feature;

a second shooting control unit 56, configured to control the camera to turn toward the sound source object according to a sound source angle corresponding to the sound source object associated with the sound feature.

Optionally, the device for controlling camera shooting further includes:

an angle determining unit 57, configured to determine a sound source angle of the sound source object sending the new voice when a new voice is detected;

a second determining unit 58, configured to determine whether the sound source angle of the sound source object sending the new voice is within a preset range of the sound source angle corresponding to the sound source object recorded;

a third shooting control unit 59, configured to: if the sound source angle of the sound source object sending the new voice is within a preset range of the sound source angle corresponding to the sound source object recorded, then controlling the camera to turn according to the recorded sound source angle corresponding to the source object, such that the sound source object corresponding to the sound source angle of the new voice is located within the image shooting range of the camera.

In the embodiment 5 of the present application, when a voice is detected, whether a keyword is contained in the voice is first identified, and if a keyword is contained in the voice, determining a sound source angle of the sound source object sending the voice, then controlling the camera to turn according to the sound source angle of the sound source object sending the voice, such that the sound source object sending the voice is located within the image shooting range of the camera, thereby the camera is effectively turned to shoot the sound source object, and prevent the camera from frequently turning and causing shaking when multiple people are speaking at the same time, and the accuracy of video shooting is improved, the user experience is enhanced.

Embodiment 6

Figure 6:
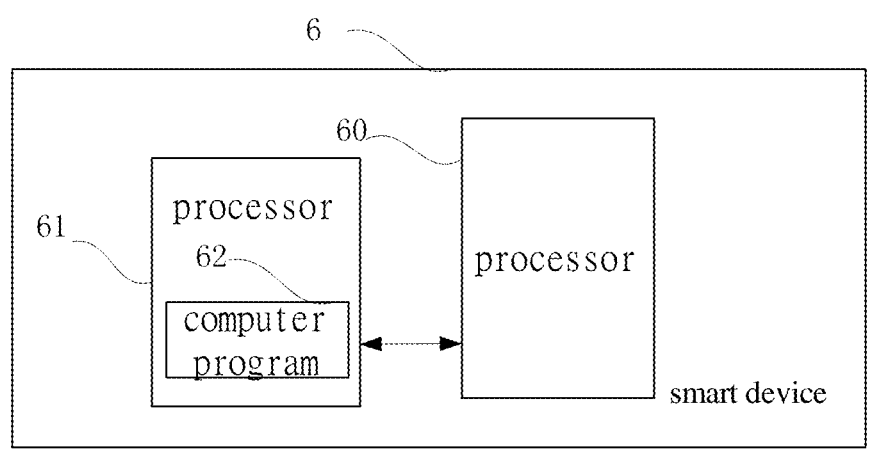
FIG. 6 is a schematic diagram of a smart device according to an embodiment of the present application.

FIG. 6 is a schematic diagram of a smart device according to an embodiment of the present application. As shown in FIG. 6, the smart device 6 of this embodiment includes: a processor 60, a memory 61, and a computer program 62 stored in the memory 61 and operable on the processor 60, such as a shooting control program. When the processor 60 executes the computer program 62, the steps in the above embodiments of the respective method for controlling camera shootings are implemented, such as steps 101 to 103 shown in FIG. 1. Alternatively, when the processor 60 executes the computer program 62, the functions of the various modules/units in the various device embodiments described above are implemented, such as the functions of the units 51-53 shown in FIG. 5.

Illustratively, the computer program 62 can be divided into one or more modules/units that are stored in the memory 61 and executed by the processor 60 to implement this application. The one or more modules/units may be a series of computer program instruction segments capable of performing a particular function, the instruction segments being used to describe the execution of the computer program 62 in the smart device 6.

For example, the computer program 62 can be divided into a keyword recognition unit, a sound source locating unit, and a first shooting control unit, and the specific functions of each unit are as follows:

the keyword recognition unit, configured to recognize, when the voice is detected, whether a keyword is contained in the voice;

the sound source locating unit, configured to determine a sound source angle of the sound source object sending the voice if the keyword is contained in the voice;

the first shooting control unit, configured to control the camera to turn according to a sound source angle of the sound source object sending the voice, such that the sound source object sending the voice is located within an image shooting range of the camera.

The smart device 6 can be a smart device such as a smart speaker, a smart camera, and an intelligent robot. The smart device 6 may include, but is not limited to, a processor 60, a memory 61. It will be understood by those skilled in the art that FIG. 6 is merely an example of the smart device 6, and does not constitute a limitation on the smart device 6, and may include more or less components than those illustrated, or combine some components, or different components. For example, the smart device may further include an input and output device, a network access device, a bus, and the like.

The processor 60 may be a central processing unit (CPU), or may be another general-purpose processor, a digital signal processor (DSP), an application specific integrated circuit (ASIC), Field-Programmable Gate Array (FPGA) or other programmable logic device, discrete gate or transistor logic device, discrete hardware components, etc. The general-purpose processor may be a microprocessor, or the processor is a conventional processor of any others or the like.

The memory 61 may be an internal storage unit of the smart device 6, such as a hard disk or a memory of the smart device 6. The memory 61 may also be an external storage device of the smart device 6, such as a plug-in hard disk equipped on the smart device 6, a smart media card (SMC), and a secure digital (SD) card, flash card, etc. Further, the memory 61 may also include both an internal storage unit of the smart device 6 and an external storage device. The memory 61 is used to store the computer program and other programs and data required by the smart device. The memory 61 can also be used to temporarily store data that has been output or is about to be output.

It can be clearly understood by the one of ordinary skill in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, please refer to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

Those skilled in the art will notice that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, but such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by the computer programs configured to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements, which won't make the essential of corresponding technical solution to be broken away from the spirit and the scope of the technical solution in various embodiments of the present application, should all be included in the protection scope of the present application.

What is claimed is:

1. A method for controlling camera shooting comprising steps of:
recognizing whether or not a voice contains a keyword when the voice is detected;
determining a sound source angle of a sound source object sending the voice when the voice is recognized as containing the keyword; and
controlling the camera to turn according to the sound source angle of the sound source object sending the voice, such that the sound source object sending the voice is located within an image shooting range of the camera, wherein the step of controlling the camera to turn according to the sound source angle of the sound source object sending the voice, such that the sound source object sending the voice is located within the image shooting range of the camera comprises:
acquiring a current angle of the camera;
calculating an angular difference between the sound source angle and the current angle of the camera; and
controlling the camera to turn at a first rotation speed towards the sound source object according to the angular difference between the sound source angle and the current angle of the camera; and
performing a face detection, and, when a face is detected, then controlling the camera to turn at a second rotation speed, such that the sound source object sending the voice is located within the center of the image shooting range of the camera, wherein the first rotation speed is greater than the second rotation speed.

2. The method of claim 1, wherein after the step of controlling the camera to turn according to the sound source angle of the sound source object sending the voice, such that the sound source object sending the voice is located within the image shooting range of the camera, further comprising:
recording and associating a voice feature of the voice and the sound source angle of the sound source object sending the voice, when the sound source object sending the voice is within the image shooting range of the camera.

3. The method of claim 2, wherein the voice feature comprises a sound feature, the method further comprises:
judging, when a new voice is detected, whether a voice feature of the new voice is the same as the voice feature recorded when the new voice is detected;
acquiring a sound source angle corresponding to the sound source object associated with the sound feature if the sound feature of the new voice is the same as the voice feature recorded; and
controlling the camera to turn towards the sound source object according to the sound source angle corresponding to the sound source object associated with the sound feature.

4. The method of claim 2, wherein the method further comprises:
determining a sound source angle of a sound source object sending a new voice, when the new voice is detected;
judging whether the sound source angle of the sound source object sending the new voice is within a preset range of a sound source angle corresponding to the sound source object recorded; and
controlling the camera to turn according to the sound source angle corresponding to the sound source object recorded if the sound source angle of the sound source object sending the new voice is within the preset range of the sound source angle corresponding to the sound source object recorded, such that the sound source object corresponding to the sound source angle of the new voice is located within the image shooting range of the camera.

5. A method of controlling camera shooting comprising:
recognizing whether or not a voice contains a keyword when the voice is detected;
determining a sound source angle of a sound source object sending the voice when the voice is recognized as containing the keyword;
controlling the camera to turn according to the sound source angle of the sound source object sending the voice, such that the sound source object sending the voice is located within an image shooting range of the camera, wherein after the step of controlling the camera to turn according to the sound source angle of the sound source object sending the voice, such that the sound source object sending the voice is located within the image shooting range of the camera, further comprising:
recording and associating a voice feature of the voice and the sound source angle of the sound source object sending the voice, when the sound source object sending the voice is within the image shooting range of the camera;
determining a new sound source angle of a sound object sending a new voice, when the new voice is detected;
judging whether the new sound source angle of the sound source object sending the new voice is within a preset range of a sound source angle corresponding to the sound source object recorded; and
controlling the camera to turn according to the sound source angle corresponding to the sound source object recorded only when the new sound source angle of the sound source object sending the new voice is within the preset range of the sound source angle corresponding to the sound source object recorded, such that the sound source object corresponding to the new sound source angle of the new voice is located within the image shooting range of the camera.

6. The method of claim 5, wherein the voice feature comprises a sound feature, the method further comprises:
judging, when another new voice is detected, whether a voice feature of the another new voice is the same as the voice feature recorded when the another new voice is detected based upon at least one of sound frequency, tone, sound intensity, and pitch;
acquiring a sound source angle corresponding to the sound source object associated with the sound feature if the sound feature of the another new voice is the same as the voice feature recorded; and
controlling the camera to turn towards the sound source object according to the sound source angle corresponding to the sound source object associated with the sound feature.

7. A smart device, comprising a memory, a processor, and a computer program stored in the memory and operable on the processor, wherein when the computer program is executed by the processor, the steps of the method for controlling camera shooting according to claim 1 are implemented.

8. A device for controlling camera shooting, wherein the device comprises:

a keyword recognition unit, configured to recognize whether a keyword is contained in a voice when the voice is detected;

a sound source locating unit, configured to determine a sound source angle of a sound source object sending the voice if the keyword is contained in the voice; and a first shooting control unit, configured to control the camera to turn according to the sound source angle of the sound source object sending the voice, such that the sound source object sending the voice is located within an image shooting range of the camera, wherein the first shooting control unit comprises:

an angle acquiring module, configured to acquire a current angle of the camera;

an angle calculation module, configured to calculate an angular difference between the sound source angle and the current angle of the camera; and a rotation control module, configured to control the camera to turn at a preset rotation speed according to the angular difference between the sound source angle and the current angle of the camera, such that the sound source object sending the voice is located within an image shooting range of the camera, wherein the rotation control module comprises:

a first rotation sub-module, configured to control the camera to turn toward the sound source at a first rotation speed according to an angular difference between the sound source angle and the current angle of the camera; and a second rotation sub-module, configured for performing face detection, and if a face is detected, controlling the camera to turn at a second rotation speed, such that the source object sending the voice is located within the center of the image shooting range of the camera, wherein the first rotation speed is greater than the second rotation speed.

9. The device of claim 8, wherein the device further comprises:

an association recording unit, configured to record and associate a voice feature of the voice and the sound source angle corresponding to the sound source object sending the voice when the sound source object sending the voice is within the center of the image shooting range of the camera.

10. The device of claim 8, wherein the device further comprises:

a first judgment unit, configured to judge whether a sound feature of a new voice is the same as a voice feature recorded when the new voice is detected; and a second shooting control unit, configured to control the camera to turn toward the sound source object according to a sound source angle corresponding to the sound source object associated with the sound feature.

11. The device of claim 8, wherein the device further comprises:

an angle determining unit, configured to determine a sound source angle of the sound source object sending a new voice when the new voice is detected;

a second determining unit, configured to determine whether the sound source angle of the sound source object sending the new voice is within a preset range of the sound source angle corresponding to the sound source object recorded; and a third shooting control unit, configured to control the camera to turn according to the recorded sound source angle corresponding to the sound source object, when the sound source angle of the sound source object sending the new voice is within a preset range of the sound source angle corresponding to the sound source object recorded, such that the sound source object corresponding to the sound source angle of the new voice is located within the image shooting range of the camera.

12. The method of claim 5, wherein the step of controlling the camera to turn according to the sound source angle of the sound source object sending the voice, such that the sound source object sending the voice is located within an image shooting range of the camera comprises:

controlling the camera to turn at a first rotation speed towards the sound source object according to the angular difference between the sound source angle and the current angle of the camera; and performing a face detection, and, when a face is detected, then controlling the camera to turn at a second rotation speed, such that the sound source object sending the voice is located within the center of the image shooting range of the camera, wherein the first rotation speed is greater than the second rotation speed.

13. A smart device, comprising a memory, a processor, and a computer program stored in the memory and operable on the processor, wherein when the computer program is executed by the processor, the steps of the method for controlling camera shooting according to claim 5 are implemented.

* * * * *